United States Patent [19]

Westall

[11] Patent Number: 5,344,906
[45] Date of Patent: Sep. 6, 1994

[54] PROCESS FOR PRODUCING ORGANOSILOXANES

[75] Inventor: Stephen Westall, Wales, United Kingdom

[73] Assignee: Dow Corning Limited, Tokyo, Japan

[21] Appl. No.: 107,093

[22] Filed: Aug. 16, 1993

[30] Foreign Application Priority Data

Sep. 5, 1992 [GB] United Kingdom ............... 92181841

[51] Int. Cl.5 .............................................. C08G 77/08
[52] U.S. Cl. ...................................... 528/13; 528/18; 528/21; 528/23
[58] Field of Search ....................... 528/13, 18, 21, 23

[56] References Cited

U.S. PATENT DOCUMENTS 3,160,601 12/1964 Hyde .................................. 260/46.5
5,206,328 4/1993 Okamura et al. ..................... 528/21
5,209,775 5/1993 Bank et al. ............................ 528/18

FOREIGN PATENT DOCUMENTS 1172661 12/1969 United Kingdom .

*Primary Examiner*—Melvyn I. Marquis
*Attorney, Agent, or Firm*—Robert L. McKellar

[57] ABSTRACT

Process for the production of condensation products or organosilicon compounds having at least one silicon-bonded hydroxyl group. The process comprises contacting the organosilicon compound with a quaternary ammonium borate, -phosphate, -carbonate or -silicate. May be employed for example for the polymerisation of α, w silanol-terminated polydiorganosiloxanes and for the production of organosiloxanes having organofunctional e.g. aminoalkyl groups.

7 Claims, No Drawings

PROCESS FOR PRODUCING ORGANOSILOXANES

This invention relates to the production of organosiloxanes by a process involving the condensation of silicon-bonded hydroxyl groups.

It is known to produce organosiloxane polymers by the polymerisation or copolymerisation of relatively low molecular weight organosiloxanes. The process is well-known in the production of commercial silicones and generally involves contacting cyclic or short chain linear organosiloxanes with a basic or acidic catalyst. A variety of such catalysts have been disclosed in patents and other technical literature including, for example, alkali metal hydroxides, alkali metal silanolates, sulphuric acid, hydrochloric acid, Lewis acids, tetramethylammonium hydroxide and tetrabutylphosphonium silanolate. Other polymerisation catalysts are disclosed in British Patent No. 1 172 661 which teaches the preparation of siloxane polymers employing catalysts which are certain quaternary ammonium and phosphonium boron complexes. Such catalysts produce the desired increase in molecular weight by the scission and rearrangement of siloxane bonds. However, as a result of such rearrangement the product often contains a significant proportion of cyclics and other low molecular weight organosiloxanes. In order to employ the product in certain applications, for example in the fabrication of silicone elastomers, it is necessary to remove these low molecular weight components by devolatilisation thereby adding to the production cost. Rearrangements of the siloxane bonds is also undesirable when the organosiloxane polymer product is to contain a predetermined distribution of two or more different organic substituents, such as in the production of polydimethylsiloxanes containing a proportion of silicon-bonded organofunctional e.g. aminoalkyl groups.

A method for increasing the molecular weight of organosiloxanes which largely avoids the disadvantage arising from siloxane bond rearrangement requires the condensation of silicon-bonded hydroxyl groups. Catalysts for promoting ≡SiOH+SiOH condensation whilst minimising siloxane bond cleavage are disclosed in British Patent 895 091.

According to the present invention there is provided a process for the production of an organosilicon condensation product which comprises contacting (A) at least one organosilicon compound having in the molecule at least one silanol group and wherein the silicon-bonded organic substituents are selected from monovalent hydrocarbon groups having from 1 to 14 carbon atoms and monovalent substituted hydrocarbon groups having from 1 to 10 carbon atoms in which the substituents are selected from amino, halogen, mercapto, hydroxyl, amido and ester, with (B) a quaternary ammonium compound selected from quaternary ammonium phosphates, quaternary ammonium borates, quaternary ammonium carbonates and quaternary ammonium silicates.

The process of this invention may be applied in the production of condensation products of any type of organosilicon silicon compound having at least one silanol, that is ≡SiOH, group in the molecule. Thus, the organosilicon compound may be an organosilane, organosiloxane or a silcarbane or mixtures of the same type or of different types of such organosilicon compounds. The silicon-bonded organic substituents in the organosilicon compound may be monovalent hydrocarbon groups having from 1 to 14 carbon atoms, for example alkyl, aryl, aralkyl, alkaryl or alkenyl groups or monovalent substituted hydrocarbon groups having from 1 to 10 carbon atoms for example amino-substituted alkyl and aryl groups, mercaptoalkyl groups, haloalkyl groups, esterified carboxyalkyl groups and hydroxy-alkyl groups. Specific examples of the organic substituents which may be present in the organosilicon compounds employed in the process of this invention are methyl, ethyl, propyl, hexyl, dodecyl, tetradecyl, phenyl, xylyl, tolyl, phenylethyl, vinyl, allyl, hexenyl, —RNH$_2$, —RNHCH$_2$CH$_2$NH$_2$, —RSH, —RBr, —RCl and —ROH wherein R represents a divalent organic group, preferably having less than 8 carbon atoms for example alkylene e.g. —(CH$_2$)$_3$— and —CH$_2$CHCH$_3$CH$_2$—, arylene e.g. —C$_6$H$_4$— or aralkylene e.g. —(C$_6$H$_4$.CH$_3$)—. For the majority of commercial applications at least 50% of the organic substituents will be methyl, any remaining substituents being selected from vinyl and phenyl.

Although applicable to any type of organosilicon compound having at least one silanol group the process of this invention is particularly useful for the production of higher molecular weight organosiloxane polymers from lower molecular weight hydroxylated species. For example, during the production of organosiloxanes by the hydrolysis of the corresponding organochlorosilanes there is obtained a mixture of low molecular weight organosiloxanes having two or more silanol groups per molecule. The process of this invention may be employed to increase the molecular weight of such organosiloxanes while avoiding the production of undue amounts of volatile siloxanes. According to a preferred embodiment of this invention the organosilicon compounds (A) are α,w silanol-terminated polydiorganosiloxanes, that is substantially linear organosiloxane polymers and oligomers having a hydroxyl group attached to each terminal silicon atom. Such polydiorganosiloxanes include those which can be represented by the average general formula

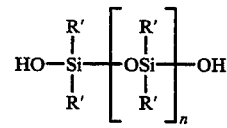

wherein each R' represents the hereinabove defined organic substituents and n is an integer, preferably from 1 to about 100. Commercially the R' substituents are normally predominantly methyl with any remaining R' substituents being selected from vinyl and phenyl. Said silanol terminated polydiorganosiloxanes are produced when diorganohalosilanes are hydrolysed during the commercial production of silicones. The resulting hydrolysis product is usually subjected to a separation procedure whereby the cyclic siloxanes, which are also formed, are removed by distillation.

If desired the condensation products may be end-stopped with triorganosiloxy units. One method of effecting such end-stopping comprises incorporating a triorganoalkoxy silane in the reaction mixture as hereinafter described. However, a more preferred method of producing end-stopped polydiorganosiloxanes employing the process of this invention comprises employing as organosilicon compound (A) both (i) a silanol-terminated polydiorganosiloxane and (ii) a polydiorganosiloxane having a silanol group at one terminal position in the molecule and a triorganosiloxy group at the other.

The catalyst substance (B) is a quaternary ammonium phosphate, quaternary ammonium borate, quaternary ammonium carbonate or quaternary ammonium silicate. They may be represented by the general formula $(R_4N^+)_nX^{(-)n}$ wherein each R represents hydrogen or a hydrocarbon group, preferably having up to 12 carbon atoms, n has a value of 2, 3 or 4 and X represents $PO_4$, $BO_4$, $CO_3$ or $SiO_4$, not more than one R being hydrogen. Specific examples of R groups are methyl, ethyl, butyl, dodecyl and benzyl. Examples of catalysts (B) are benzyltrimethylammonium phosphate, tetramethylammonium borate, benzyltrimethylammonium phosphate, dodecyltrimethylammonium carbonate, tetrabutylammonium silicate and tetrabutylammonium phosphate. More than one type of tetramethylammonium compound may be employed in a given reaction. At least some of the quaternary ammonium compounds (B) are known materials. They may be prepared, for example by the reaction of the corresponding quaternary ammonium hydroxide with the appropriate, e.g. phosphoric or boric, acid. The quaternary ammonium borates appear to be the most active and are preferred for use in the process of this invention.

The process of this invention involves contacting the organosilicon compound (A) with the catalyst (B) at a temperature at which the desired rate of molecular weight increase occurs. The temperatures employed may vary within wide limits for example from about 30° C. to about 130° C. Reaction at the lower temperatures is, however, normally too slow for commercial purposes and the process is preferably carried out at temperatures within the range from about 70° C. to 120° C. Preferably also, the removal of water and other volatile substances formed during the condensation reaction is accelerated by carrying out the process under reduced pressure, that is, at a pressure less than normal atmospheric and most preferably less than about 0.5 bar. Most conveniently the quaternary ammonium compound (B) is employed as a solution or dispersion in an organic solvent, for example an alcohol such as methyl alcohol or ethyl alcohol.

One method of carrying out the process is by means of a batch procedure. For example, (B) may be dispersed in the organosilicon compound (A) and the mixture raised to the required temperature. Alternatively, the organosilicon compound may be preheated prior to the addition of (B). Advantageously the mixture is agitated during the reaction period. Sufficient of (B) is employed to achieve the desired rate of condensation having regard to the nature and geometry of the processing equipment, temperature and other factors. From considerations of speed of reaction and economy of operation we prefer to employ from about 0.001 to about 5% by weight of the quaternary ammonium compound (B) based on the weight of the organosilicon compound. Depending on the reaction temperatures employed it may be necessary or desirable to add further quantities of (B) during the reaction to replace any loss due to thermal decomposition and to maintain the catalyst content at the desired level. Termination of the condensation reaction, if desired, may be achieved by for example lowering the temperature of the mixture and/or by raising the reaction pressure to atmospheric. However, an advantage of the catalysts (B) of this invention is that they are thermally unstable. Termination of the reaction and removal of the catalyst may thus be brought about by increasing the temperature of the reaction mixture to that at which any residual quaternary ammonium compound breaks down and volatilises.

Because of their thermally transient nature the catalysts (B) can be adapted for use in processes involving manufacture on a continuous, rather than a batch, basis. Properly employed such so-called "continuous processes" avoid the delays and costs common to batch processing, for example those involved in the charging and discharging of the reaction vessel and separation of the catalyst material from the product. Thus, for example, the process of this invention may be advantageously employed for the continuous production of higher molecular weight siloxane polymers from lower molecular weight hydroxyl-containing species. Continuous production can be carried out by passing the mixture of organosilicon compound (A) and catalyst (B) through a reactor maintained at the desired reaction temperature and thereafter into a second reactor which is maintained at a temperature at which the catalyst breaks down and is removed.

The process of this invention is suitable for use in the preparation of a variety of organosilicon products by a condensation reaction. If desired there may be included with the organosilicon compound (A) other organosilicon compounds for example silanes having silicon-bonded alkoxy groups which are reactive with the silanol-containing reactant or condensation product to provide in the molecule organofunctional or chain-terminating groups. Examples of such alkoxysilanes are $(CH_3)_3SiOCH_3$, $CH_3C_6H_5Si(OCH_3)_2$ and $C_6H_5CH_3(CH_2=CH)SiOC_2H_5$. Catalysts, for example strontium hydroxide and barium hydroxide, for the reaction $\equiv SiOH + \equiv SiOR$ may be added if desired to expedite the reaction between the alkoxysilane and the silanol-containing organosilicon product. The process is particularly adapted for the production of organosiloxanes having silicon-bonded aminoalkyl or (polyamino)alkyl groups employing an alkoxysilane having therein a silicon-bonded alkyl group containing at least one amino substituent, for example $H_2N(CH_2)_3Si(CH_3.)_2OCH_3$ and $H_2NCH_2CH_2NH(CH_2)_3SiCH_3(OC_2H_5)_2$. When such amino-containing silanes are employed it is generally not necessary to employ an additional catalyst for the $\equiv SiOH + \equiv SiOR$ reaction.

The condensation products produced by the process of this invention may be employed in any of the variety of applications for the corresponding products made by prior art procedures. For example they find application as heat transfer liquids in the treatment of textiles to render them water repellent and to impart softness, as components of paper coating compositions to impart non-stick properties and in the production of adhesives and sealing materials.

The following Examples in which Me, Et and Vi respectively represent the methyl, ethyl and vinyl groups and the viscosities are measured at 25° C. illustrate the invention.

EXAMPLE 1

Benzyltrimethylammonium borate (I) was prepared by adding boric acid (1.9 g, 0.03 mol) to a 40% by weight solution in methyl alcohol of benzyltrimethylammonium hydroxide (39.69 g, 0.09 mol). An exothermic neutralisation reaction occurred.

Benzyltrimethylammonium phosphate (II) and tetra (n-propyl)ammonium phosphate (III) and tetra(n-propyl) ammonium borate (IV) were similarly prepared.

To separate 1000 g portions of an α,w silanol-terminated polydimethylsiloxane having a viscosity of 87 cS (87 mm²/s) and Mn (by gpc) of 3300 were added respectively 3 ml of the solutions of quaternary ammonium compounds prepared as described above. The resulting mixtures were heated to 105° C. at a pressure of 50 mm.Hg for 30 minutes during which time the polydimethylsiloxane increased in viscosity. The siloxane was then cooled and the viscosity and number average molecular weight measured on each sample. The results were as follows:

|     | Final Viscosity (mm²/s) | Final Mn |
| --- | --- | --- |
| I   | >800,000 | —       |
| II  | 65,000   | 93,320  |
| III | 22,800   | 37,141  |
| IV  | 361,600  | 127,460 |

EXAMPLE 2

Benzyltrimethylammonium borate (I) and benzyltrimethylammonium phosphate (II) solutions were prepared as described in Example 1. Benzyltrimethylammonium carbonate solution (V) was prepared by adding a large excess of solid carbon dioxide pellets to a 40% by weight solution of benzyltrimethylammonium hydroxide in methyl alcohol.

To separate 1000g portions of a mixture of α trimethylsiloxy-w hydroxy polydimethylsiloxane and α,w silanol-terminated polydimethylsiloxane were added respectively 1 ml of I, II and V. The silanol mixture prior to the addition of the quaternary ammonium compounds had a viscosity of 329 mm²/s, a silanol content of 0.111% and a $Me_3SiO_{0.5}$ content of 0.84%. The resulting mixtures were heated to 105° C. under a pressure of 150 mmHg ($2 \times 10^4$ Pa.) for 6 hours during which period samples were taken and their viscosities measured. The respective viscosities after 6 hours were as follows:

|     |            |
| --- | ---------- |
| I   | 1680 mm²/s |
| II  | 1140 mm²/s |
| V   | 1140 mm²/s |

EXAMPLE 3

An α,w silanol-terminated polydimethylsiloxane having a viscosity of 70 mm²/s (953g) was heated to 85° C. and to it was then added with stirring $H_2N(CH_2)_3SiMe(OEt)_2$ (47g) and I (1 g). The resulting mixture was refluxed at 85° C. and atmospheric pressure for 2 hours after which the pressure was reduced to 600 mm Hg. ($8 \times 10^{-4}$ Pa). Viscosity measurements were made at one hourly intervals and when no further increase in viscosity occurred (after 5 hours) the temperature was increased to 150° C. and pressure restored to atmospheric for 1 hour. The product was a copolymer of dimethylsiloxane and methyl(aminopropyl)siloxane units and had a viscosity of 1210 mm²/s.

The above described procedure was repeated except that the silane reactant employed was $MeViSi(OEt)_2$. A copolymer of methylvinylsiloxane and dimethylsiloxane having a maximum viscosity of 390 mm²/s was obtained after 6 hours.

That which is claimed is:

1. A process for the production of an organosilicon condensation product which comprises contacting (A) at least one organosilicon compound having in the molecule at least one silanol group, and silicon-bonded organic substituents wherein the silicon-bonded organic substituents are selected from monovalent hydrocarbon groups having from 1 to 14 carbon atoms or monovalent substituted hydrocarbon groups having from 1 to 10 carbon atoms in which the substituents of the monovalent substituted hydrocarbon groups are selected from amino, halogen, mercapto, hydroxyl, amido or ester, with (B) a quaternary ammonium compound selected from quaternary ammonium phosphates, quaternary ammonium borates, quaternary ammonium carbonates or quaternary ammonium silicates.

2. A process as claimed in claim 2 wherein organosilicon compound (A) is a polydiorganosiloxane having a hydroxyl group attached to each terminal silicon atom.

3. A process as claimed in claim 1 wherein organosilicon compound (A) has a silanol group at one terminal position in the molecule and a triorganosiloxy group at a second terminal position.

4. A process as claimed in claim 1 wherein there is present with organosilicon compound (A) a silane having silicon-bonded alkoxy groups which are reactive with the silicon-bonded groups in (A) or the condensation product of (A).

5. A process as claimed in claim 4 wherein the silane having silicon-bonded alkoxy groups also has a silicon-bonded alkyl group substituted with at least one amino group.

6. A process as claimed in claim 1 wherein (B) is a quaternary ammonium borate.

7. A process as claimed in claim 1 wherein any residual quaternary ammonium compound B is subsequently removed from the condensation product by thermal decomposition.

* * * * *